May 1, 1945.  F. B. SIMPSON  2,374,784
DEVICES FOR GRINDING THE PISTONS AND MEASURING
CHAMBERS OF WATER METERS
Filed Oct. 19, 1942   3 Sheets-Sheet 1

FIELDING B. SIMPSON,
INVENTOR

BY Clifford C. Bradbury
ATTORNEY.

May 1, 1945.  F. B. SIMPSON  2,374,784
DEVICES FOR GRINDING THE PISTONS AND MEASURING
CHAMBERS OF WATER METERS
Filed Oct. 19, 1942  3 Sheets-Sheet 2

FIELDING B. SIMPSON,
INVENTOR.

BY *Clifford C. Bradbury*
ATTORNEY.

May 1, 1945.  F. B. SIMPSON  2,374,784
DEVICES FOR GRINDING THE PISTONS AND MEASURING
CHAMBERS OF WATER METERS
Filed Oct. 19, 1942   3 Sheets-Sheet 3

FIELDING B. SIMPSON,
INVENTOR.

BY Clifford C. Bradbury
ATTORNEY.

Patented May 1, 1945

2,374,784

UNITED STATES PATENT OFFICE 2,374,784

DEVICE FOR GRINDING THE PISTONS AND MEASURING CHAMBERS OF WATER METERS

Fielding B. Simpson, Richmond, Ind., assignor of one-third to Charles Plauche, Lake Alfred, Fla., and one-third to Harrington-Hoch, Incorporated, Richmond, Ind., a corporation of Indiana Application October 19, 1942, Serial No. 462,480

7 Claims. (Cl. 51—26)

This invention relates to devices for grinding the pistons and measuring chambers of water meters.

The object of this invention is to provide a grinding device which is somewhat automatic in its operation in that after being set for the commencement of a grinding operation no attendant is needed, provision being made automatically to stop the grinding operation either as the result of an over-load or an under-load.

My invention is particularly applicable to grinding-in new over-size oscillatory piston discs in the repair of the measuring chambers of meters which have become worn through use.

In accordance with my invention a new disc piston, slightly over-size, may be placed within the water meter measuring chamber, the halves of which are slightly separated to prevent undue pressure between the circumference of the disc and the spherical walls of the chamber. Oscillation is caused by the rotation of a shaft, preferably driven by an electric motor. The grinding machine proper is provided with means for pressing the chamber halves toward one another until the grinding pressure between the piston disc and the walls of the chamber is the greatest practicable for satisfactory grinding. The machine is then left to operate without an attendant and will continue to operate and grind until the piston disc has either become ground away until its friction has decreased to a predetermined load, or until through expansion or other cause its resistance to oscillation has increased beyond a predetermined setting of the machine.

When the machine has stopped, the operator returning to it determines whether it has stopped because of over-load or under-load. If it is for over-load the operator will back off the clamping mechanism slightly to separate the halves of the measuring chamber to relieve the pressure usually caused by expansion of the disc. If the machine has stopped on account of under-load the operator will re-start the machine and tighten the clamping mechanism until the load stands somewhere between the upper and lower limits. When the two halves of the measuring chamber eventually have been pressed together to their shoulders and the machine eventually stops because of under-load, the operator knows that the clearance between the disc and the walls of the chamber are of the proper degree and that the grinding operation has been completed.

My invention is illustrated in the accompanying drawings in which.

Figure 1:
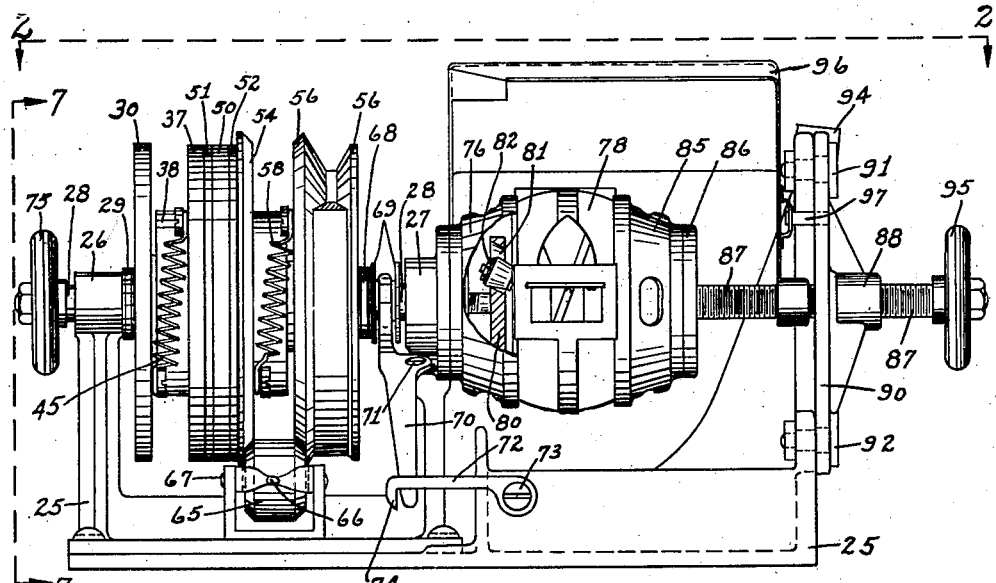
Fig. 1 is an elevation, partly in section, of the preferred form of the machine with a measuring chamber in place to be ground.
Figure 2:
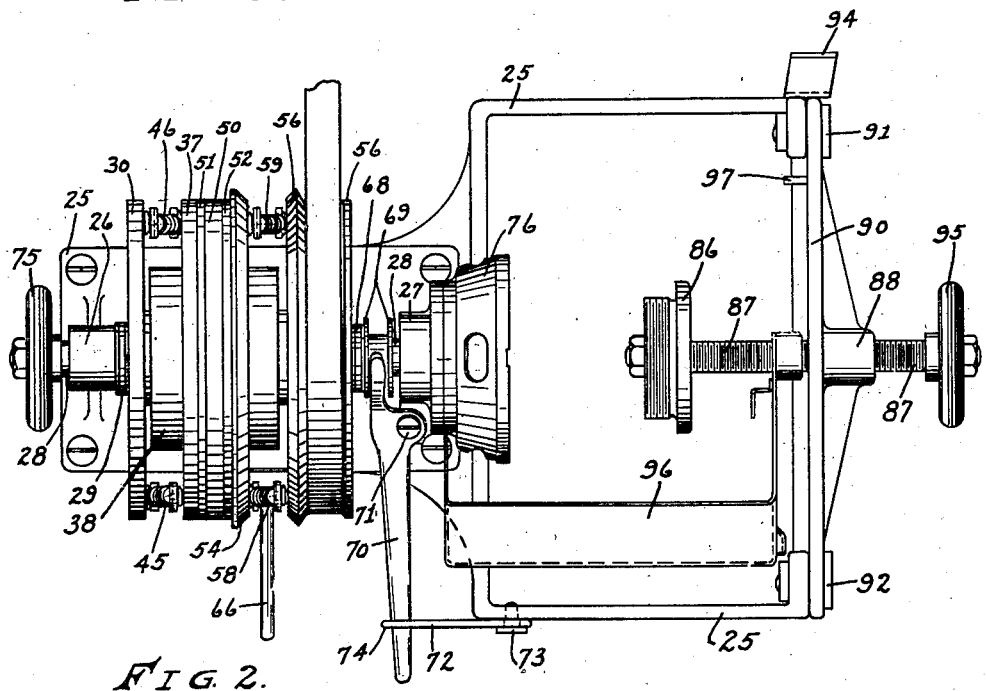
Fig. 2 is a plan of the machine shown in Fig. 1 with the measuring chamber removed.
Figure 3:
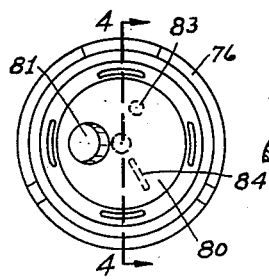
Fig. 3 is a face view of the left-hand chamber clamping member of Figs. 1 and 2, showing also the driving disc.
Figures 9, 10:
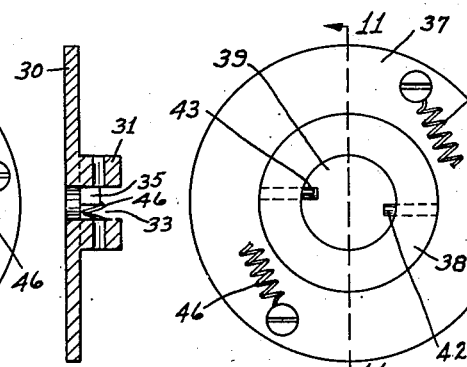
Fig. 9 is a section on the line 9—9 of Fig. 8.
Fig. 10 is a left end view of the over-load clutch element.
Figure 11:
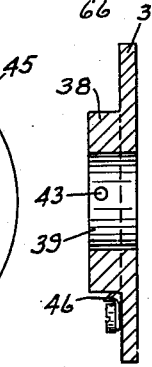
Fig. 11 is a section on the line 11—11 of Fig. 10.
Figure 12:
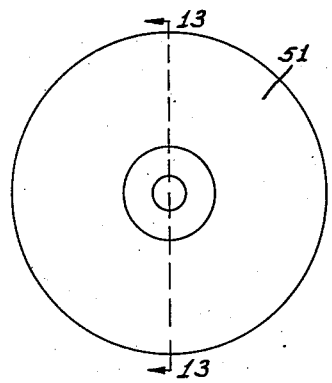
Fig. 12 is an end elevation of the middle clutch element.
Figure 13:
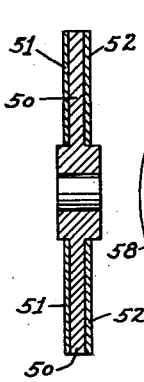
Fig. 13 is a section on the line 13—13 of Fig. 12.

Referring particularly to Figs. 1 and 2, a base and frame member 25 carries bearing members 26 and 27 within and between which a shaft 28 rotates. A thrust bearing 29 surrounds the shaft 28 adjacent and abutting the bearing 26. Attached to and always rotating with the shaft 28 and abutting the thrust bearing 29 is an over-load clutch control disc 30, Figs. 1, 2, 8 and 9. The disc 30 is provided with a hub 31 which is off-set to the right of the disc 30 in Figs. 1, 2 and 9. The hub 31 is provided with a diametric slot 33 in which two steps 34 and 35 are located. These steps being about one-half of the depth and one-half of the width of the diametric slot 33, and each extending inwardly from the periphery of the hub toward the shaft 28 on opposite sides and from opposite ends of the slot 33. Cooperating with the clutch control disc 30 is a clutch disc 37 provided with a hub 38 having an axial opening 39 of such size as to provide a working fit about the hub 31 of the over-load clutch control disc 30. Pins 42 and 43 extend through the hub 38 in positions to enter the opposite ends of the slot 33 and to rest upon the steps 34 and 35 or to fall into the spaces between the steps 34 and 35 and the opposite walls of the slot 33. Tension springs 45 and 46 extend between the clutch control disc 30 and the clutch disc 37 and are given such normal strength or tension that they hold the pins 43 and 44 on top of the steps 34 and 35 respectively, and against their associated edges of the slot 33 unless and until the torque between the clutch disc 37 and the clutch control disc 30 exceeds the pre-determined over-load torque. When this happens the pins 42 and 43 will move off of the steps 34 and 35 respectively permitting the clutch disc 37 to move to the left to release the clutch hereinafter described.

Figure 14:
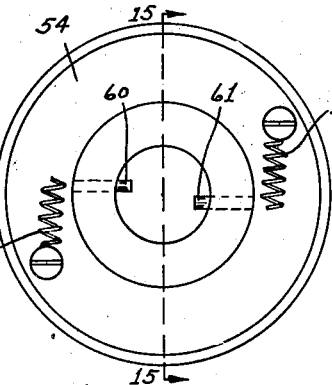
Fig. 14 is a right end view of the under-load clutch element.
Figure 15:
Fig. 15 is a section on the line 15—15 of Fig. 14.
Figure 16:
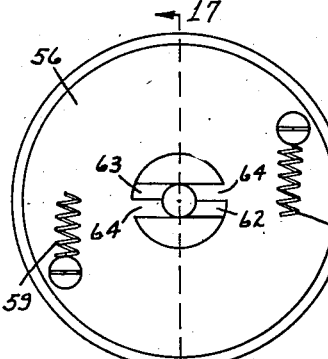
Fig. 16 is a left end view of the under-load clutch controlling member and drive pulley.
Figure 17:
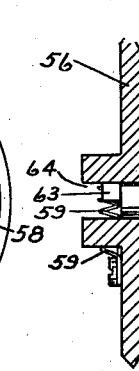
Fig. 17 is a section on the line 17—17 of Fig. 16.

Loosely mounted on the shaft 28 and to the right of the clutch disc 37 is a disc 50, Figs. 1, 2, 12 and 13, having friction surfaces 51 and 52. The surface 51 being adapted to contact the right-hand face of the clutch disc 37 and the surface 52 being adapted to contact the left-hand face of clutch disc 54, Fig. 14. The disc 54 and its associated parts are similar to the disc 37 and its associated parts, and the disc 56 and its associated parts are similar to the disc 30 and its associated parts, excepting that the springs 58 and 59 are of less normal tension than springs 45 and 46 and are of such strength and tension that they are continuously stretched beyond their normal condition sufficiently to permit the pins 60 and 61 to be held by the driving torque in positions over the steps 62 and 63 and against the faces of the slot 64 above the steps 62 and 63.

A roller 65 carried on the end of a lever 66 pivoted at 67 may be forced between the clutch control disc 56 and the clutch disc 54 by the downward movement of the projecting end of the lever 66 to prevent the pins 60 and 61 from dropping off of the steps 62 and 63 respectively as the machine is being started.

A thrust bearing 68 surrounds the shaft 28 and abuts the right face of the pulley and clutch control disc 56. A double flanged collar 69 abuts the right face of the thrust bearing 68. The collar 69 may be moved along the shaft 28 by means of a yoke and operating lever 70 pivoted at 71 on a portion of the bearing 27. A latch 72 pivoted at 73 has a depending end member 74 which may be dropped back of the operating lever 70 to hold the clutch control and clutch members in operating contact at such time as the torque delivered to the pulley 56 is not less than the under-load nor greater than the over-load characteristics of the clutch control springs and associated mechanisms.

In order that an operator may test the resistance to rotation of the shaft 28, a suitable hand wheel 75 is attached to the left end of the shaft 28.

Figure 4:
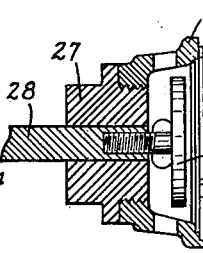
Fig. 4 is a section on the line 4—4 of Fig. 3.
Figure 5:
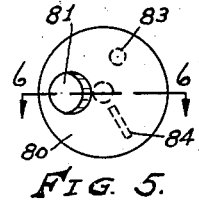
Fig. 5 is a face view of the particular type of driving disc assembled in the clamping member of Figs. 3 and 4.
Figure 6:
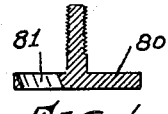
Fig. 6 is a section on the line 6—6 of Fig. 5.
Figure 7:
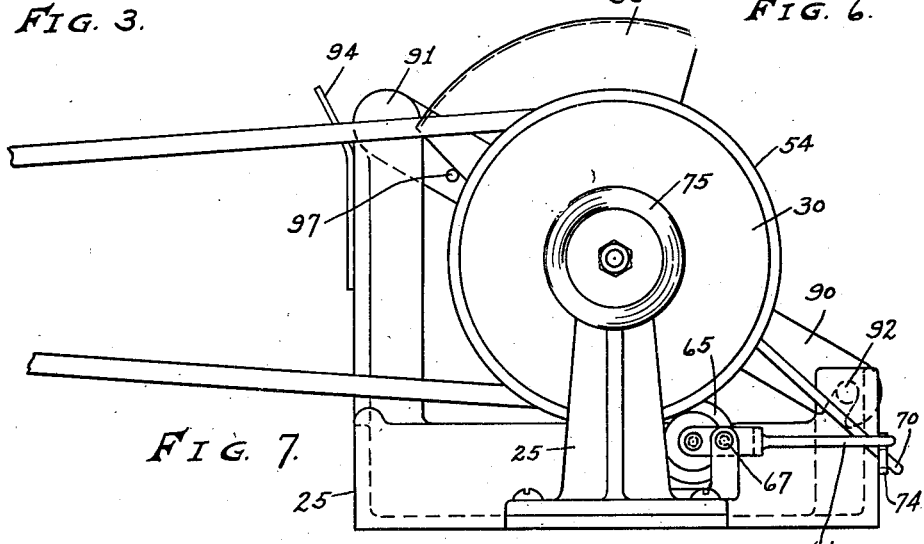
Fig. 7 is a left end elevation of the machine shown in Fig. 1.
Figure 8:
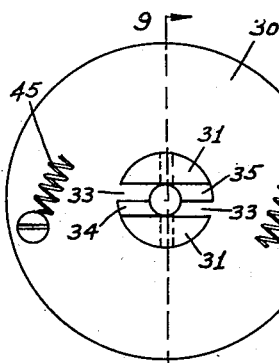
Fig. 8 is a right end view of the left or over-load clutch operating element.

A chamber clamping member 76 is threaded onto the bearing 27 as shown in Fig. 4. This clamping member as here shown constitutes a jig for holding a particular type of meter measuring chamber 78 here illustrated. It is to be understood, however, that various types of measuring chambers are to be clamped in my regrinding machine and that the clamping member 76 will be varied in form to suit the particular type of measuring chamber being ground. In the particular form illustrated, a plate 80, Figs 3 to 6, is provided with an eccentric opening 81 into which the eccentric operating projection 82, Fig. 1, extends, and by which the disc to be ground of the water meter receives its oscillating motion through the rotation of the plate 80. Different makes of meters have different shaped operating levers corresponding to 82, some being mere pins without rollers, some being flat wings. It is to be understood that the plate 80 may be provided with various kinds of openings. Two additional openings 83 and 84 are shown in dotted lines on Fig. 5.

A second chamber clamping member 85 is threaded onto a collar 86 journaled on the end of a threaded shaft 87. The shaft 87 extends through a hub 88 at the center of a link 90 which has one end pivoted to the base and frame member at 91 and the other end attached to the base and frame member at 92. To make it convenient to put in and take out different meter measuring chambers, the link 90 is freed at its lowered end and swung about its pivot 91 until it rests against the support 94. A hand wheel 95 carried on the end of the threaded shaft 87 facilitates the adjustment of the clamping member 85 against the right half of the measuring chamber 78. A shield 96 carried on the threaded shaft 87 may be swung upwardly against the stop 97 in which position it prevents water or grinding compound which is splashed upwardly out of the measuring chamber 78 from spattering beyond the machine base. When the shield 96 is turned downwardly in the position shown in Fig. 2 it is out of the way of the operator when putting in or taking out measuring chambers to be ground.

Figure 19:
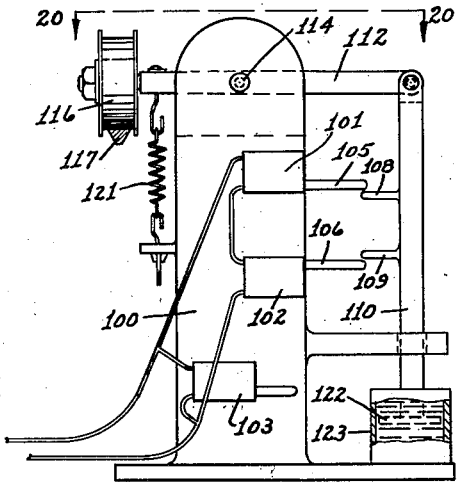
Fig. 19 is an end elevation of the switch operating member and switch circuit used in the modification shown in Fig. 18.
Figure 20:
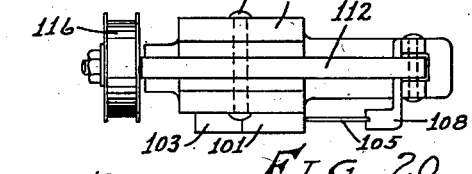
Fig. 20 is a top view of the mechanism shown in Fig. 19.
Figure 18:
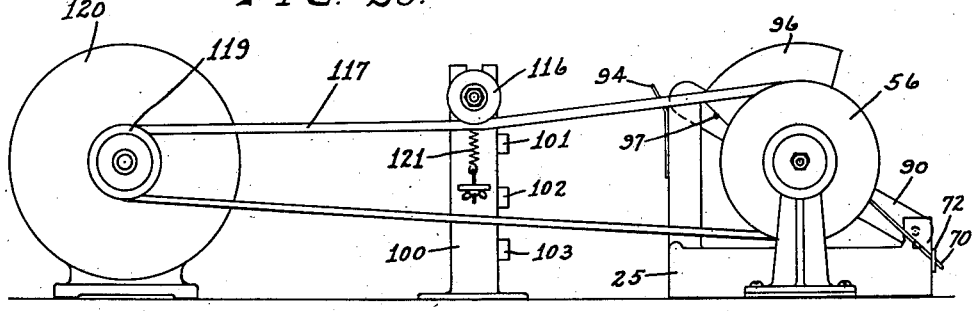
Fig. 18 is a modified form of under-load and over-load control.

In accordance with the modification of my invention illustrated in Figs. 18, 19 and 20, the pulley 56 is fixedly applied to the shaft 28 and all of the clutch and clutch operating devices are omitted. The over-load and under-load characteristics performed by the clutches, springs and clutch control discs of the preferred embodiment are here incorporated in a switch mechanism comprising a standard 100 supporting ordinary make and break snap switches 101, 102 and 103. The operating lever 105 of switch 101 and the operating lever 106 of switch 102 are engaged respectively by arms 108 and 109, the arm 108 moving upwardly to open switch 101 and the arm 109 moving downwardly to open switch 102. The arms 108 and 109 are carried upon a vertical shaft 110 moved by a cross shaft 112 pivoted at 114 on the support 100. The opposing end of the lever 112 carries a pulley 116 which rests upon the driving half of the V-belt 117 at a point substantially midway between the pulley 56 and the pulley 119 of the drive motor 120. A spring 121 applies a predetermined downward pressure upon the pulley 116 and consequently creates a predetermined normal depression at the center of the belt 117. The lower end of the vertical shaft 110 is provided with the piston 122 within an oil chamber 123 to form a dash pot to prevent rapid up and down movement of the vertical shaft 110 due to variations in the width of the belt and similar abnormal condition. The snap switch 103 is hand operated and is connected to bridge the switches 101 and 102, the latter switches being connected in series with one another so that the closing of switch 103 completes the circuit of the motor 120 and the simultaneously closing of the switches 101 and 102 maintain the circuit of the motor after the switch 103 has been manually opened.

In the operation of the preferred embodiment of my invention a measuring chamber having an over-sized disc in it and being provided internally with a suitable grinding compound is placed between the clamping members 76 and 85 and the hand wheel 95 is turned until the halves of the measuring chamber press upon the external edge of the disc to be ground with such pressure as the operator determines by the hand rotation of the hand wheel 75 to be slightly less than the maximum desirable for satisfactory grinding of over-sized discs. At this time the motor or other source of power for driving the pulley 56 has been started and the pulley 56 is rotating, but the clutch faces 51 and 52 are not now in operating contact with their respective clutch discs 37 and 54.

The operator therefore presses downwardly on the projecting end of lever 66 forcing the roller 65 between the clutch control discs 56 and the clutch disc 54 to move the pins 60 and 61 out of their slots and above the upper surfaces of the steps 62 and 63 respectively. The operator then moves the clutch operating lever 70 to the right, Fig. 2, which presses the clutch to the left, Fig. 2, until lever 70 catches behind the end 74 of the latch 72, thus bringing the clutch faces into contact with one another and causing the shaft 28 to be driven through both the under-load and over-load clutches. In this driving condition the pins 60 and 61 of the under-load clutch are held upon their respective steps 62 and 63 by the torque which now exceeds the counter-pull of the springs 58 and 59, and the pins 42 and 43 of the over-load clutch rest upon their steps 34 and 35 respectively because the strength of the springs 45 and 46 exceeds the torque. If now for any reason the torque becomes greater than the reaction of springs 45 and 46, those springs will be stretched and the pins 42 and 43 will drop into the portions of the slot 33 adjacent the steps permitting the clutch member 37 to move to the left away from clutch face 51 releasing the clutch and stopping the machine. If on the other hand, the torque becomes less than the reaction of the springs 58 and 59, then a relative rotation will take place between the clutch control disc and pulley 56, and the clutch disc 54 and the pins 60 and 61 will drop off of the steps 62 and 63 permitting the clutch disc 54 to move to the right away from the clutch face 52, releasing the clutch and stopping the machine. By the proper selection of strength of springs for the over-load and under-load clutch mechanisms, the machine will come to rest either when the load has decreased due to a proper portion of the piston disc having been ground away, or else the machine will come to rest because of too rapid grinding and consequent heating and expansion of the disc being ground. When the machine has stopped the operator can tell by observing which clutch face has moved away from the clutch disc 50 whether the machine has stopped because of an excessive torque or because of an under torque. If the under torque condition occurs before the halves of the measuring chamber are forced entirely together, then the machine is re-started and the hand wheel 95 turned inwardly until the proper torque again has been established. If the machine has stopped because of over-load condition the hand wheel 95 is turned outwardly to relieve the presssure between the disc being ground and the measuring chamber walls until a proper torque is again established.

In accordance with the modification of Figs. 18, 19 and 20 the operator after setting the machine to proper torque by hand testing, closes the switch 103 which starts the motor 120. When the motor has been started the operator closes both switches 101 and 102 and then opens switch 103. So long as the load remains within the acceptable limits as determined by the setting of the spring tension of spring 121, the machine will continue to operate. If the torque becomes too great the pulley 116 will be raised, the vertical shaft 110 lowered, and the switch 102 operated to open the circuit and stop the motor 120. Conversely, if the torque becomes too light the spring 121 will pull the pulley 116 downwardly, raising the vertical shaft 110 and opening the switch 101 to stop the motor. Upon the return to the machine the operator may test by rotating the hand wheel 75 to determine which condition has stopped the machine, the same as in the operation of the preferred modification of my invention.

Although I have illustrated and described my invention with respect to a preferred form and a modification, it is to be understood that I do not wish to be unduly limited thereto, mechanical equivalents of the embodiments herein illustrated and described being within the purview of my invention.

I claim:

1. A machine for regrinding water meters which have measuring chamber sections with a wabbling piston between them, said machine having a pair of parallel faced jigs for holding the measuring chamber sections, manual means for advancing one of the jigs toward the other whereby the water meter measuring chamber sections are advanced toward one another with the planes of their separation maintained parallel, a rotatable shaft for wabbling the piston between the measuring chamber sections, power means for rotating the shaft, a clutch for interrupting the power connection with said shaft, and a hand wheel on the shaft for testing its resistance to rotation to guide the operator in the adjustment of said manual means.

2. A machine for regrinding water meters which have measuring chamber sections with a wabbling piston between them, said machine having a pair of parallel faced jigs for holding the measuring chamber sections, manual means for advancing one of the jigs toward the other whereby the water meter measuring chamber sections are advanced toward one another with the planes of their separation maintained parallel, a rotatable shaft for wabbling the piston between the measuring chamber sections, power means for rotating the shaft, a clutch for interrupting the power connection with said shaft, and over-load and under-load control devices for said clutch for disengaging the clutch faces in response to either a predetermined high resistance to the rotation of said shaft or to a predetermined low resistance to the rotation of said shaft.

3. A machine for regrinding water meters which have measuring chamber sections with a wabbling piston between them, said machine having a pair of parallel faced jigs for holding the measuring chamber sections, manual means for advancing one of the jigs toward the other whereby the water meter measuring chamber sections are advanced toward one another with the planes of their separation maintained parallel, a rotatable shaft for wabbling the piston between the measuring chamber sections, power means for rotating the shaft, a clutch for interrupting the power connection with said shaft, and over-load and under-load control devices for said clutch for disengaging the clutch faces in response to either a predetermined high resistance to the rotation of said shaft or to a predetermined low resistance to the rotation of said shaft, and a hand wheel on the shaft for testing its resistance to rotation after it has been automatically stopped to guide the operator in the adjustment of said manual means.

4. A machine for regrinding water meters which have measuring chamber sections with a wabbling piston between them, said machine having a pair of parallel faced jigs for holding the measuring chamber sections, manual means for advancing one of the jigs toward the other whereby the water meter measuring chamber sections are advanced toward one another with the planes of their separation maintained parallel, a rotatable belt pulley and shaft for wabbling the piston, an electric motor having a belt pulley, a belt for conducting power from the motor pulley to said shaft pulley, mechanism having a part contacting said belt at a point intermediate the motor and shaft pulleys and adapted to be moved to different positions responsive to changes of torque being transmitted from the motor pulley to the shaft pulley through said belt, an over-load switch in the circuit of the motor having its actuating lever in position to be contacted by said mechanism to open the switch when the pull on the belt causes it to approach a straight line between the motor pulley and the shaft pulley, and an under-load switch in the circuit of the motor having its actuating lever in position to be contacted by said mechanism to open the switch when the pull on the belt decreases causing it to assume less than a predetermined angle at the intermediate point between the motor and shaft pulleys.

5. A machine for regrinding water meters which have measuring chamber sections with a wabbling piston between them, said machine having a pair of parallel faced jigs for holding the measuring chamber sections, manual means for advancing and withdrawing one of the jigs toward and from the other whereby the water meter measuring chamber sections approach and recede from one another with the planes of their separation maintained parallel, a rotatable belt pulley and shaft for wabbling the piston, an electric motor having a belt pulley, a belt for conducting power from the motor pulley to said shaft pulley, a mechanism contacting said belt at a point intermediate the motor and the shaft pulleys and moved to different positions responsive to different amounts of torque transmitted from the motor pulley to the shaft pulley through said belt, an over-load switch in the circuit of the motor having its actuating lever in position to be contacted by said mechanism to open the switch when the pull on the belt causes it to approach a straight line between the motor pulley and the shaft pulley, and an under-load switch in the circuit of the motor having its actuating lever in position to be contacted by said mechanism to open the switch when the pull on the belt decreases causing it to assume less than a predetermined angle at the intermediate point between the motor and the shaft pulleys at the position at which said mechanism contacts said belt, and a hand wheel on the shaft for testing its resistance to rotation to guide the operator in the adjustment of said manual means.

6. In a water meter measuring chamber grinding machine, a driving shaft, a driven shaft, an under-load clutch control member surrounding and carried by said driving shaft, a first under-load clutch member surrounding and carried by said driving shaft, a second clutch member surrounding and carried by said driving shaft and rotatable with the driven shaft, axially alignable abutments on said clutch control member and said first under-load clutch member adapted when aligned to hold said members apart, means to press said clutch members and said abutments toward one another to create driving friction between the clutch members, a spring extending between the clutch control member and the first under-load clutch member tending to force said abutments out of alignment with one another, said spring being stretched to an extent proper to hold said abutments in alignment with one another by the normal operating torque between the clutch control member and the first clutch member.

7. In a water meter measuring chamber grinding machine, a driving shaft, a driven shaft aligned with the driving shaft, an under-load clutch control member surrounding and carried by said driving shaft, a first under-load clutch member surrounding and carried by one of said shafts, a second clutch member surrounding and carried by one of said shafts, axially alignable abutments on said clutch control member and said first under-load clutch member adapted when aligned to hold said members apart, means to press said clutch members and said abutments together to create driving friction between the clutch members, a spring extending between the clutch control member and the first under-load clutch member tending to force said abutments out of alignment with one another, said spring being stretched to an extent proper to hold said abutments in alignment with one another by the normal operating torque between the clutch control member and the first clutch member, and manually operable means for holding said clutch control member and said first under-load clutch member apart, and the first and second clutch members in engagement with one another while starting the rotation of said drive shaft.

FIELDING B. SIMPSON.